United States Patent [19]

Jyh

[11] Patent Number: 5,758,600
[45] Date of Patent: Jun. 2, 1998

[54] LIVESTOCK DUNG-COLLECTOR

[76] Inventor: Suen Chyuan Jyh, No. 2, Lane 36, Yeng-Hwa St., Dah-Sheh, Kaohsiung Country, Taiwan

[21] Appl. No.: 800,168

[22] Filed: Feb. 13, 1997

[51] Int. Cl.⁶ .................................................. A01K 1/01
[52] U.S. Cl. .................................... 119/161; 119/164
[58] Field of Search ................................. 119/161, 164, 119/436, 439

[56] References Cited

U.S. PATENT DOCUMENTS

| | | | |
|---|---|---|---|
| 4,011,837 | 3/1977 | Ksioszk | 119/164 |
| 4,112,872 | 9/1978 | Van Huis | 119/439 X |
| 4,323,033 | 4/1982 | Vosyka et al. | 119/436 X |
| 4,338,337 | 7/1982 | Frankl | 119/161 X |
| 5,099,795 | 3/1992 | Nagel | 119/439 |

FOREIGN PATENT DOCUMENTS

1774845 A3  11/1992  U.S.S.R. .................. 119/164

*Primary Examiner*—Gene Mancene
*Assistant Examiner*—Yvonne R. Abbott
*Attorney, Agent, or Firm*—Morton J. Rosenberg; David I. Klein; Jun Y. Lee

[57] ABSTRACT

This invention relates to a livestock dung-collector which has a pair of rotary shafts respectively mounted at the lower front and back comers of a split-rail pen, the front rotary shaft can be driven by a driving device; a piece of net cloth is disposed between the front and the back rotary shaft, and both sides of the cloth are connected by chains; a plurality of horizontal support rods and vertical support bodies are used to support the cloth so as to provide a dung-collector for livestock industry.

5 Claims, 4 Drawing Sheets

LIVESTOCK DUNG-COLLECTOR

BACKGROUND OF THE INVENTION

This invention relates to a livestock dung-collector, particularly a dung-collector used to collect and retrieve livestock dung so as to reproduce the dung into a king of fertilizer which will not pollute the environment. The dung-collector uses a driving device and a piece of net cloth between a pair of rotary shafts to set apart the dung from the urine of the livestock so as to collect the dung and reproduce it into a kind of fertilizer.

In recent years, the way to raise livestock such as sheep and cattle has been changed partly because there are few grazing grounds available and partly because few grass can be used to feed the animals. Therefore, the present way to raise the livestock is to put the animals into a split-rail pen, feed them with artificial fodder, and let the dung drop down on the ground under the split-rail pen. After the dung is accumulated for a period of time, it will be fluched and cleaned.

But the present way to deal with the livestock dung has a disadvantage; that is, the animals' excreta dropped and accumulated under the pen will mix up with the urine and become overlapping, confused, and desified. After a time, the mixed-up will produce bad odor and attract lots of mosquitoes and flies; besides, the dung flushed and washed will still pollute the environment and the men's and animals' health will be affected, too.

In the past, domestic animals are fed with natural food, mainly, the green grass, so the excreta has no organic materials left and there is no value for us to retrieve the dung and reproduce it into fertilizer; the present way to raise livestock is to use artificial fodder instead of grass, and the artificial fodder contains lots of organic materials, so livestock's excreta has organic materials left in it; as a result, it can be reused as a kind of fertilizer. So the conventional way of flushing the dung is not an economic way at all. It is necessary to improve the conventional way of dealing with the livestock dung. To solve the problem, the present invention, a livestock dung-collector, is deviced to collect dung easily so as to reproduce it into a kind of fertilizer and help to solve the problem of environmental pollution; it can be used for the livestock husbandry to upgrade its economic benefits and the environmemtal sanitation.

The main object of the invention is to provide a dung-collector which has a pair of rotary shafts respectively mounted at the lower front and back corners of a split-rail pen, the front rotary shaft can be driven by a driving device; a piece of net cloth is disposed between the front and the back rotary shaft, and both sides of the cloth are connected by chains; a plurality of horizontal support rods and vertical support bodies are used to support the cloth; besides, a conveyor belt and a dryer are parallelly mounted at the front rotary shaft; in this way, when excreta of livestock is dropped down on the net cloth, the urine will be discharged and flow through the net hole, but the dung will remain on the net cloth; then use the driving device to move the net cloth forward and carry the dung to drop down from the front edge of the rotary shaft, after the dung is dropped down, the conveyor belt will collect the dung for the dryer to dry it; by means of that, the object of collecting dung together can be achieved.

To show the structure, the traits, and other objects of the invention clearly, drawing figures of the invention are briefly described as follows:

BRIEF DESCRIPTION OF THE DRAWING FIGURES

Numbers for Reference:

| | | | |
|---|---|---|---|
| 1 | collector | 11 | shaft bearing |
| 10 | rotary shaft | 13 | chain |
| 12 | gear plate | 21 | motor |
| 20 | driving device | 30 | net cloth |
| 22 | speed reducer | 32 | sleeve cloth |
| 31 | net hole | 34 | support rod |
| 33 | sleeve cloth | 342 | connecting piece |
| 341 | roller | 40 | split-rain pen |
| 41 | guide rail | 42 | guide panel |
| 50 | conveyor belt | 60 | connector |
| 70 | dryer | | |

DETAILED DESCRIPTION OF THE PREFERRED EMBODIMENT

Figure 1:
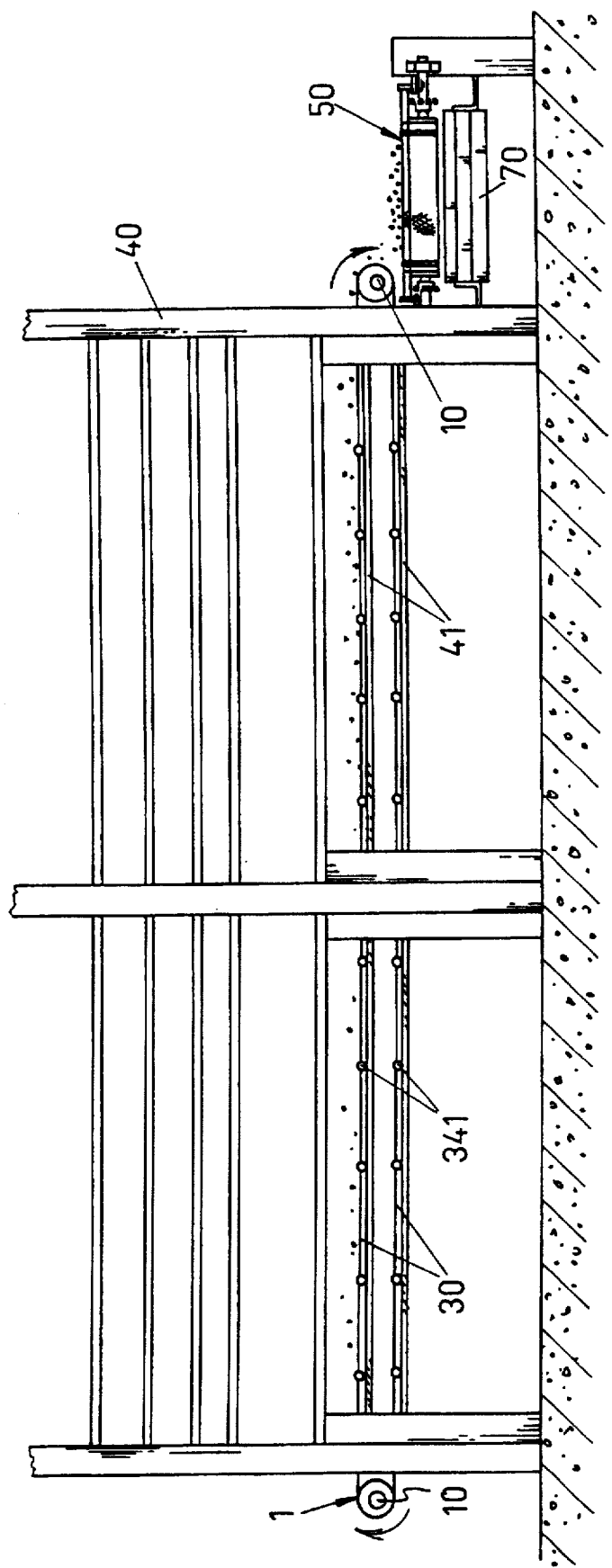
FIG. 1 is a schematic side view of the whole invention.

As shown in FIG. 1, a schematic side view of the whole invention, a collector 1 is mounted at a lower corner of a split-rail pen 40 so as to collect the sheep dung discharged by a herd of sheep raised in the pen 40.

Figure 2:
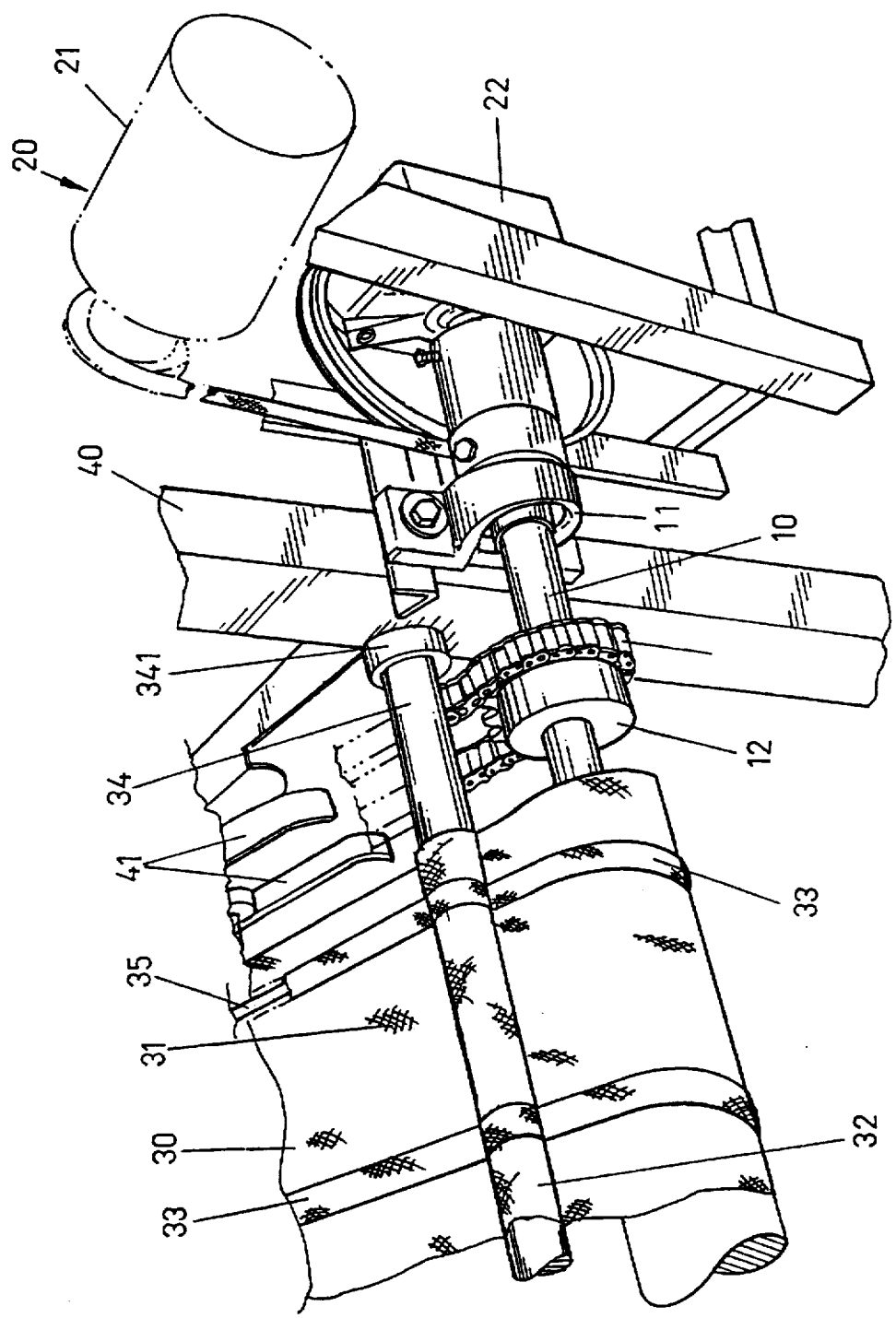
FIG. 2 is a schematic view of exterior combination of net cloth, rotary shaft; and driving device.

As for the detailed structure of the invention, refer to FIG. 2, a pair of parallel aligned guide rails 41 are respectively fixed at both sides of lower portion of the pen 40, a pair of shaft bearings 11 are used to pivot the rotary shafts 10 at the front and back lower corners of the pen 40, the front rotary shaft 10 is connected to a driving device 20 at the end of the pen 40, the driving device 20 is comprised of a motor 21 and a speed-reducer 22; the front and back rotary shafts 10 have a gear plate 12 at its sides and a chain 13 winds round the gear plate 12 so as to let the front and the back rotary shafts 10 rotate synchronously.

A piece of net cloth 30 with a plurality of net holes 31 is disposed between the front and the back rotary shaft 10, the net cloth 30 has a plurality of horizontal sleeve cloths 32 which are aligned with proper space between each other; it also has a plurality of vertical sleeve cloths 33; sleeve cloths 32, 33 are hollow and can be sewed up to the net cloth 30.

Figure 3:
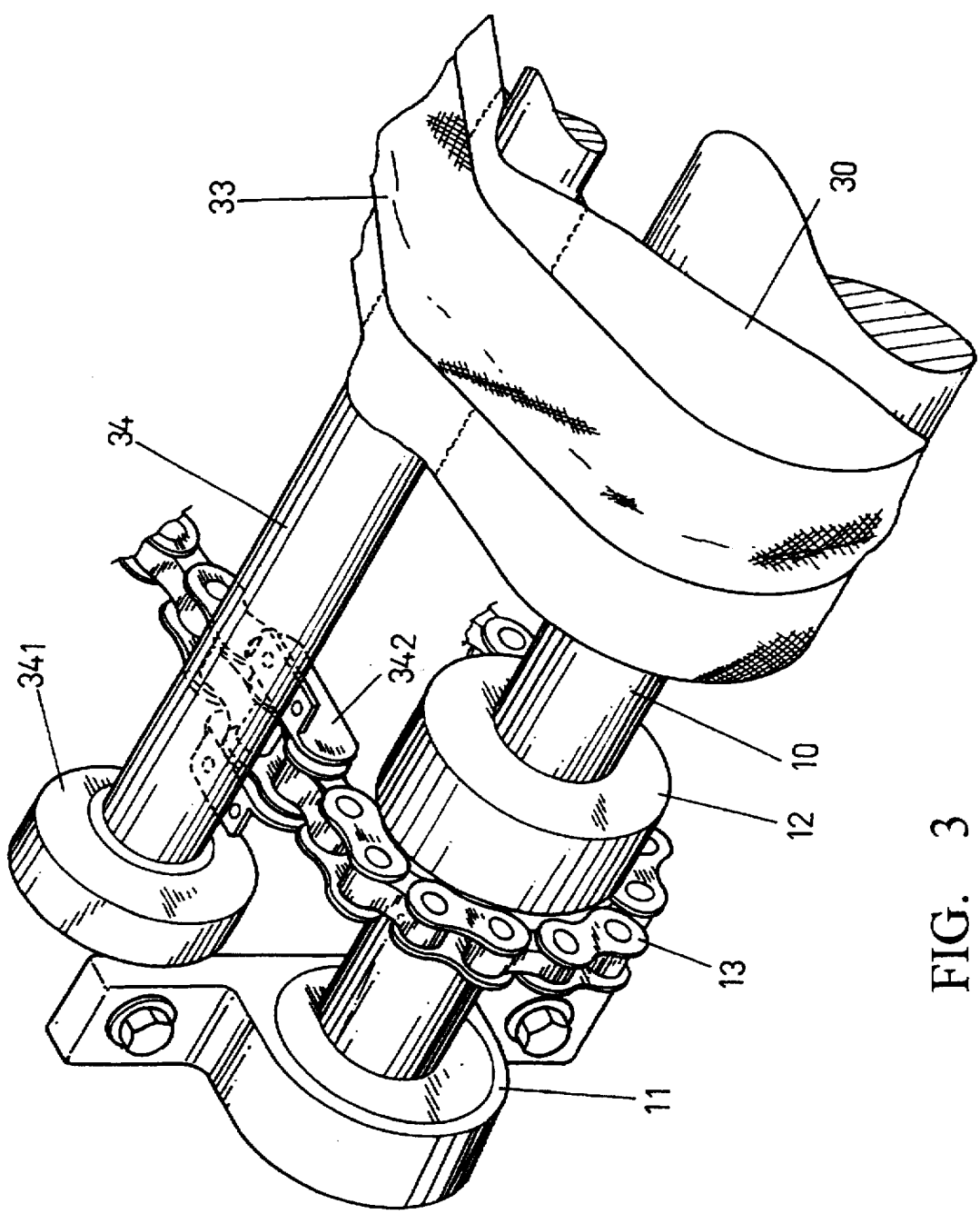
FIG. 3 is a schematic view of combination of chains and the connecting piece.

Because the horizontal and the vertical sleeve cloths 32, 33 are hollow, a horizontal support rod 34 and a vertical support body 35 are respectively inserted in them; as shown in FIG. 3, a roller 341 and a connecting piece 342 are respectively mounted on the two ends of the horizontal support rod 34, and the vertical support body 35 shaped like a post can be made of elastic materials.

As shown in FIG. 2, 3, when each unit of the invention is combined into a whole body, firstly, net cloth 30 winds round the front and the back rotary shafts 10, secondly, the horizontal support rod 34 inserts in the sleeve cloth 32 and the rollers 341 at the two ends of the horizontal support fod 34 are respectively fixed on the upper edge of the upper and the lower guide rail 41 so as to prevent the net cloth 30 from being pended down to let the dung accumulate in the recess of the cloth 30 by the weight of the horizontal support rod 34, thirdly, the connecting piece 342 of the horizontal support rod 34 is secured to the chain 13 by screw or by means of welding, fourthly, the vertical support body 35 inserts in the sleeve cloth 33 to wind the net cloth 30 round the vertical support body 35; as shown in FIG. 1, 4, the conveyor belts 50 are aligned along the side of the front rotary shaft 10, and a dryer 70 is fixed at a proper position under the end of the conveyor belt 50; (the convey belt 50 is only deviced to collect the dung, other devices to retrieve the dung can be accepted, such as a dung collecting tub or a dung collecting barrel disposed at the lower end of the rotary shaft 10) in this way, the combination of each unit of the invention is achieved.

The use of the invention is shown in FIG. 1, 2, when the livestock in the pen 40 discharge dung, the excreta will remain on the net cloth 30; when urine is discharged through net hole 31 so as to set urine apart from the dung, and when certain amount of dung is accumulated on the net cloth 30, motor 21 of the driving device will start, and the speed reducer 22 will rotate the rotary shaft 10, and by means of the chain 13, each horizontal support rod 34 will move the net cloth 30 forward, and the roller 341 of the horizontal support rod 34 will move on the guide rail 41 so as to move the dung forward on the net cloth until the dung drops down onto the conveyor belt 50 and then is carried to a dryer 70, in this way, the object of collecting the dried dung can be achieved.

Figure 4:
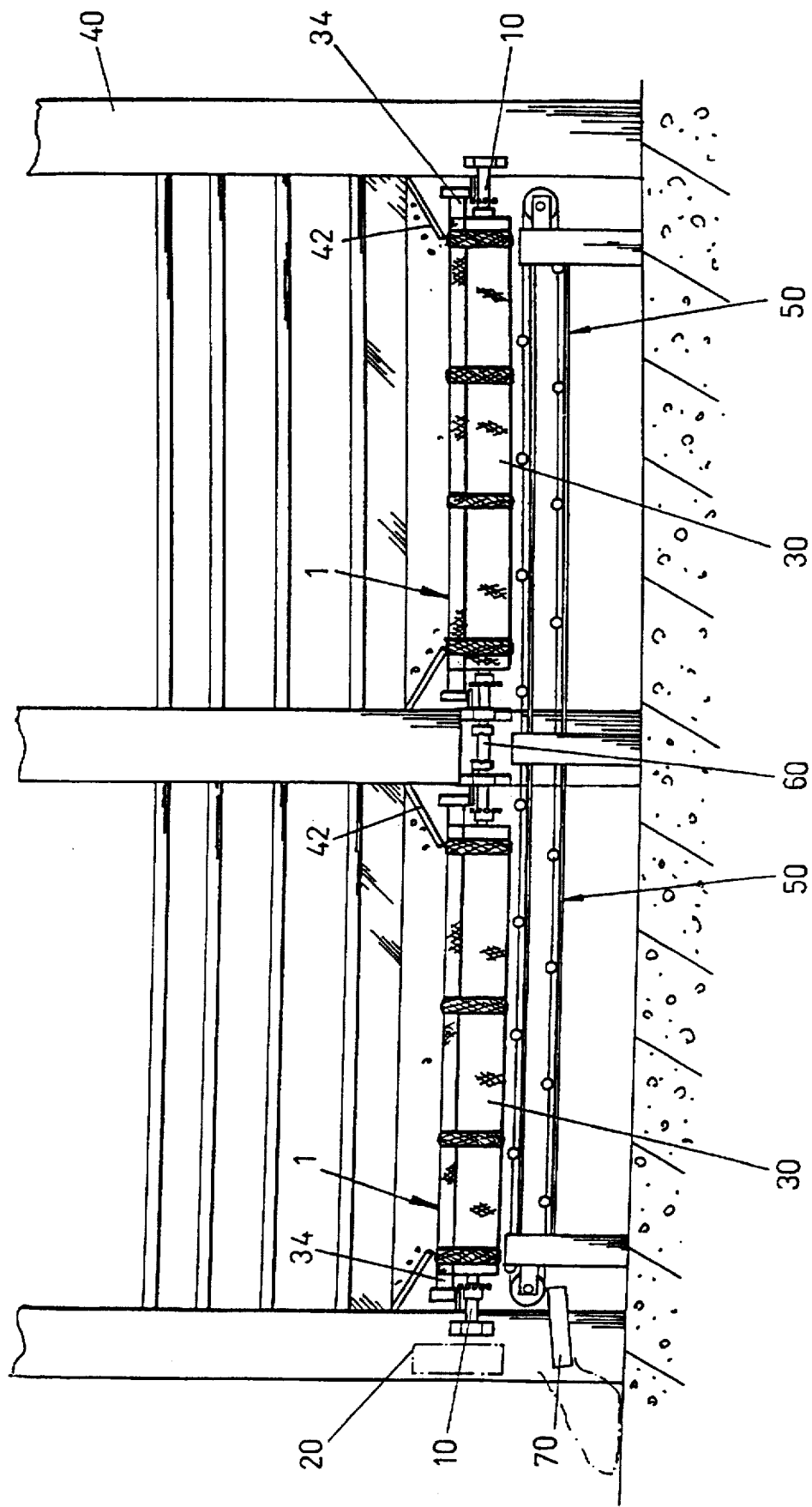
FIG. 4 is a schematic view of connecting some units of an embodiment of the invention.

As shown in FIG. 4, an embodiment of the invention, the dung-collector 1 under the split-rail pen 40 is a unit device, and the front rotary shaft 10 of each dung-collector 1 under each related pen 40 can be connected by means of connector 60 so as to start only one driving device 20 and several collectors 1 will be moved by their rotary shafts 10; in addition, between each net cloth 30 of the collector 1, there is space; a slant guide panel 42 is disposed on the upper edge of the space to guide the dung to drop through the guide panel 42 down to the net cloth 30 and prevent the dung from being dropped down to the space between two net cloths.

The present invention, the dung-collector, has a unique design, and so it has the following advantages:

1. The dung-collector 1 helps to collect and retrieve livestock dung easily and it has economic value because the retrieved dung can be reproduced into a kind of fertilizer.

2. The net cloth 30 can receive the dung dropped down from the split-rail pen 40, can discharge the urine by means of the net hole 31 so as to prevent the dung from being densified and confused so that no bad odor will attract the mosquitoes and flies and that the environment will be properly protected.

3. The horizontal support rod 34 and the vertical support body 35 are used to support the net cloth 30, which is made of soft materials; so if the cloth 30 has to receive lots of dung, the support rod 34 and the support body 35 can be used to provide the net cloth 30 a better support; the support rod 34 and the support body 35 can be fixed by sleeve cloth 32, 33, or they can be langled by thread and sewed up with the net cloth 30 directly.

So the invention is more practical than the conventional type, it breaks through the conventional way of thinking, and it is unique, progressive, and effective.

I claim:

1. A livestock dung collector mainly fixed under a split-rail pen is comprised of two rotary shafts, respectively mounted at the lower front and back corners of the pen, the two rotary shafts are each connected by chains at its two sides, and the rotary shafts are connected to a driving device;

a net cloth with net holes, the net cloth winds round the two rotary shafts, the net cloth has a plurality of horizontal support rods and a plurality of vertical support bodies to support itself horizontally and vertically, the support rods are secured to the chain on two sides by means of a connecting piece so as to move synchronously with the chains, thus it provides a practical livestock dung collector.

2. As claimed in claim 1, a livestock dung collector, wherein a pair of rollers are mounted at the two ends of the horizontal support rod, and there disposed a pair of guide rails under the lower two sides of the split-rail pen for the rollers to roll on them.

3. As claimed in claim 1, a livestock dung collector, wherein the horizontal support rod and the vertical support body can be firmly sewed up to the net cloth by means of a hollow sleeve cloth.

4. As claimed in claim 1, a livestock dung collector, wherein the horizontal support rod and the vertical support body can be firmly tangled and sewed up to the net cloth.

5. As claimed in claim 1, a livestock dung collector, wherein said driving device is comprised of a motor and a speed-reducer.

* * * * *